United States Patent [19]

Andrepont

[11] 4,299,262
[45] Nov. 10, 1981

[54] CONDUIT BYPASS OF ARTICULATED JOINT, SUCH AS AT THE BASE OF AN OFFSHORE COLUMN

[75] Inventor: John S. Andrepont, Downers Grove, Ill.

[73] Assignee: Chicago Bridge & Iron Company, Oak Brook, Ill.

[21] Appl. No.: 142,390

[22] Filed: Apr. 21, 1980

[51] Int. Cl.³ .............................................. B63B 21/50
[52] U.S. Cl. ....................................... 141/387; 9/8 P; 137/615
[58] Field of Search ........... 9/8 P; 285/133 R, 133 A, 285/265, 272, 273, 181; 141/387, 388, 279; 137/615; 244/135 A; 403/57, 223

[56] References Cited

U.S. PATENT DOCUMENTS

| | | | |
|---|---|---|---|
| 3,479,673 | 11/1969 | Manning | 9/8 P |
| 3,663,044 | 5/1972 | Contreras et al. | 285/265 X |
| 3,984,059 | 10/1976 | Davies | 141/387 |
| 4,010,500 | 3/1977 | Reid, Jr. | 9/8 P |

*Primary Examiner*—Trygve M. Blix
*Assistant Examiner*—Stephen P. Avila
*Attorney, Agent, or Firm*—Merriam, Marshall & Bicknell

[57] ABSTRACT

Apparatus by which a conduit, secured to two bodies which are connected together by an articulated joint, can bypass the joint.

The articulated joint includes first and second pivots perpendicular to each other. A conduit extends through the first pivot and through at least part of the first body. A portion of the conduit projects lateral to the second pivot and between two spaced-apart guides supported by the second body or the articulated joint whereby the second body can pivot on the second pivot with the conduit laterally projecting portion arranged between the guides. Rotation of the second body causes the guides to apply torque to the conduit laterally projecting portion. The conduit extends from the conduit laterally projecting portion into supporting arrangement on the second body.

7 Claims, 5 Drawing Figures

CONDUIT BYPASS OF ARTICULATED JOINT, SUCH AS AT THE BASE OF AN OFFSHORE COLUMN

This invention is concerned with apparatus by which a conduit, secured to two bodies which are connected together by an articulated joint, can bypass the universal joint.

BACKGROUND OF THE INVENTION

Many types of machines, apparatus and structural installations incorporate articulated joints to non-rigidly connect together two adjacent bodies when it is desired, or necessary, to have one or both of the bodies pivot with respect to the other body, or to a third body.

At times a conduit, such as a fluid conduit, must extend from or between, and be secured to, two bodies connected together by an articulated joint. Since the two bodies pivot with respect to one another at the articulated joint, it is essential that the conduit include a non-rigid yieldable section at, or in the vicinity of, the articulated joint which will not significantly interfere with the pivoting action between the bodies.

There is much present interest in fluid conduit articulated joint bypass systems by oil companies engaged in offshore exploration, development and production. This is because such endeavors often require the utilization of a deep water offshore buoyant column or tower pivotally secured in place at its lower end by an articulated joint operatively connected to a base anchored to the sea floor. Oil or gas lines or conduits desirably run along the sea floor and then up the column to the column top. From the column top, the oil or gas lines extend to a ship moored to the column. The mechanism used to moor the ship can include an articulated joint at the column top so that the ship is free to pitch and roll relative to the column. Since a fluid conduit must often extend from the column top to the ship, it is necessary that the fluid conduit include a means by which fluid can be conveyed from a conduit on the column past the articulated joint to a conduit on a ship mooring boom or yoke or to the ship itself.

Reid U.S. Pat. No. 4,010,500 discloses the use of a cardan type universal joint at the top and bottom of an offshore mooring column. The patent also discloses fluid coupling of a pipe from one side of the cardan joint to the other side by passing a conduit or pipe elbow through hollow pins of the cardan joint positioned 90° from each other. Conduit or pipe sections communicate with each end of the elbow through suitable fluid swivels so that pivotal movement of the column to the base, or the ship mooring yoke to the column, is unrestrained yet a fluid tight coupling between conduit sections is achieved. The conduit bypass system shown in Reid has a disadvantage in that it directly involves the bypass conduit in the structure of the articulated joint. In addition, it cannot be used when the column is arranged to rotate about a vertical axis and also pivot about a horizontal axis.

Other patents disclosing various types of articulated joint by-pass conduit arrangements are the U.S. Pat. No. 4,026,119 of Dotti; U.S. Pat. No. 4,029,039 van Heijst; U.S. Pat. No. 4,165,108 Saint-Palais; U.S. Pat. No. 3,641,602 Flory; U.S. Pat. No. 3,984,059 Davis; and U.S. Pat. No. 4,142,820 Tuson (which is similar to Reid, supra).

SUMMARY OF THE INVENTION

According to the invention, there is provided novel apparatus comprising a first body and a second body joined together by an articulated joint; the articulated joint including first and second pivot means perpendicular to each other; a conduit extending through the first pivot means and through at least part of the first body; a portion of the conduit projecting lateral to the second pivot means and between two spaced-apart guides supported by the second body or the articulated joint whereby the second body can pivot on the second pivot means with the conduit laterally projecting portion arranged between the guides, and rotation of the second body, such as axial to the conduit in the first body, causes the guides to apply torque to the conduit laterally projecting portion; and said conduit extending from the conduit laterally projecting portion into supporting arrangement on the second body.

More specifically, the invention provides apparatus comprising a first body and a second body joined together by an articulated joint; the articulated joint including a first pivot means for rotational movement of the first body and second body relative to each other, and a second pivot means for angular movement of the second body relative to the first body about an axis perpendicular to the first pivot; a conduit extending through the first pivot means and through at least part of the first body, with said conduit having a swivel positioned axially of the first pivot means; a portion of the conduit projecting lateral to the second pivot means and between two spaced-apart guides supported by the second body or the articulated joint whereby the second body can pivot on the second pivot means with the conduit laterally projecting portion arranged between the guides, and rotation of the second body on the first pivot means causes the guides to apply torque to the conduit laterally projecting portion; and said conduit extending from the conduit laterally projecting portion into supporting arrangement on the second body.

The described apparatus of the invention is particularly useful offshore where the first body is a base secured to a sea floor, the second body is a column, the first pivot means has a vertical axis and the second pivot means has a horizontal axis. When the second body is a column, the column lower end can have a yoke-like structure and the guides can be positioned in the yoke.

In general, it will be desirable for the conduit to have a flexible portion between the laterally projecting portion and the second body.

Although the conduit will usually be a fluid conduit for transporting a liquid or gas, or mixture thereof, it should be understood that the features of the invention are equally applicable to an electrical cable bypass of an articulated joint.

DETAILED DESCRIPTION OF THE DRAWINGS

Figure 1:
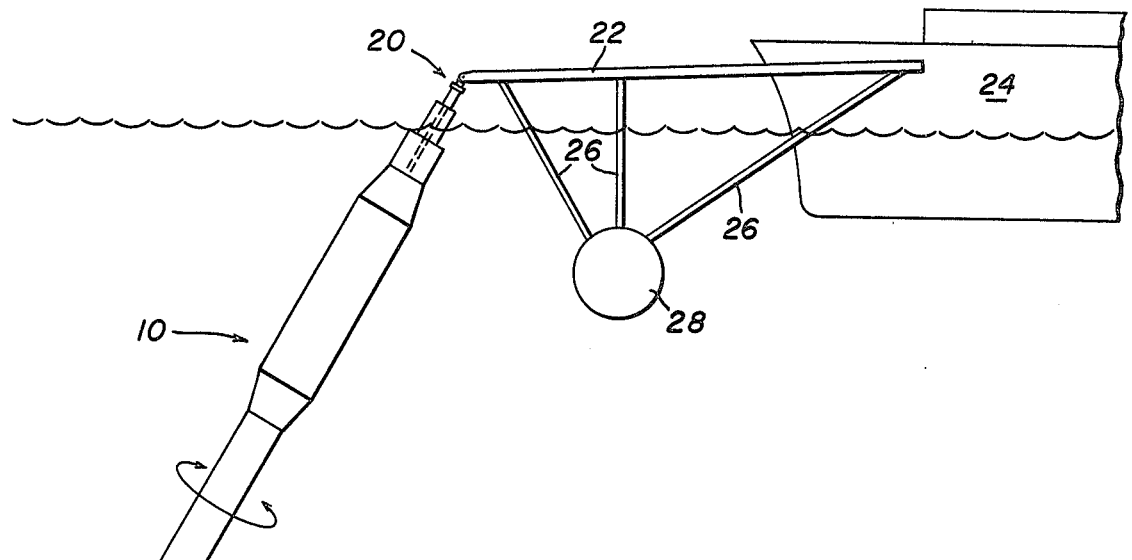
FIG. 1 is an elevational view of an offshore ship mooring column or tower secured to a base on a sea floor by an articulated joint or connection, and with a conduit bypassing the articulated joint.

So far as it is practical, the same or similar parts or elements shown in the drawings will be identified by the same numbers.

With reference to FIG. 1, the offshore column 10 (second body) has its lower end connected by articulated joint 12 to base 14 (first body) supported by sea floor 16. Conduit 18 extends upwardly from beneath sea floor 16, through the articulated joint 12.

A second articulated joint 20, which is similar to articulated joint 12, connects the top of column 10 to one end of ship mooring boom 22. The other end of boom 22 is suitably connected by a releasable and pivotable means to the bow of ship 24. Struts 26 extend downwardly from boom 22 to ballasted float 28 which maintains the boom above sea level when no ship is moored to the boom.

Figure 3:
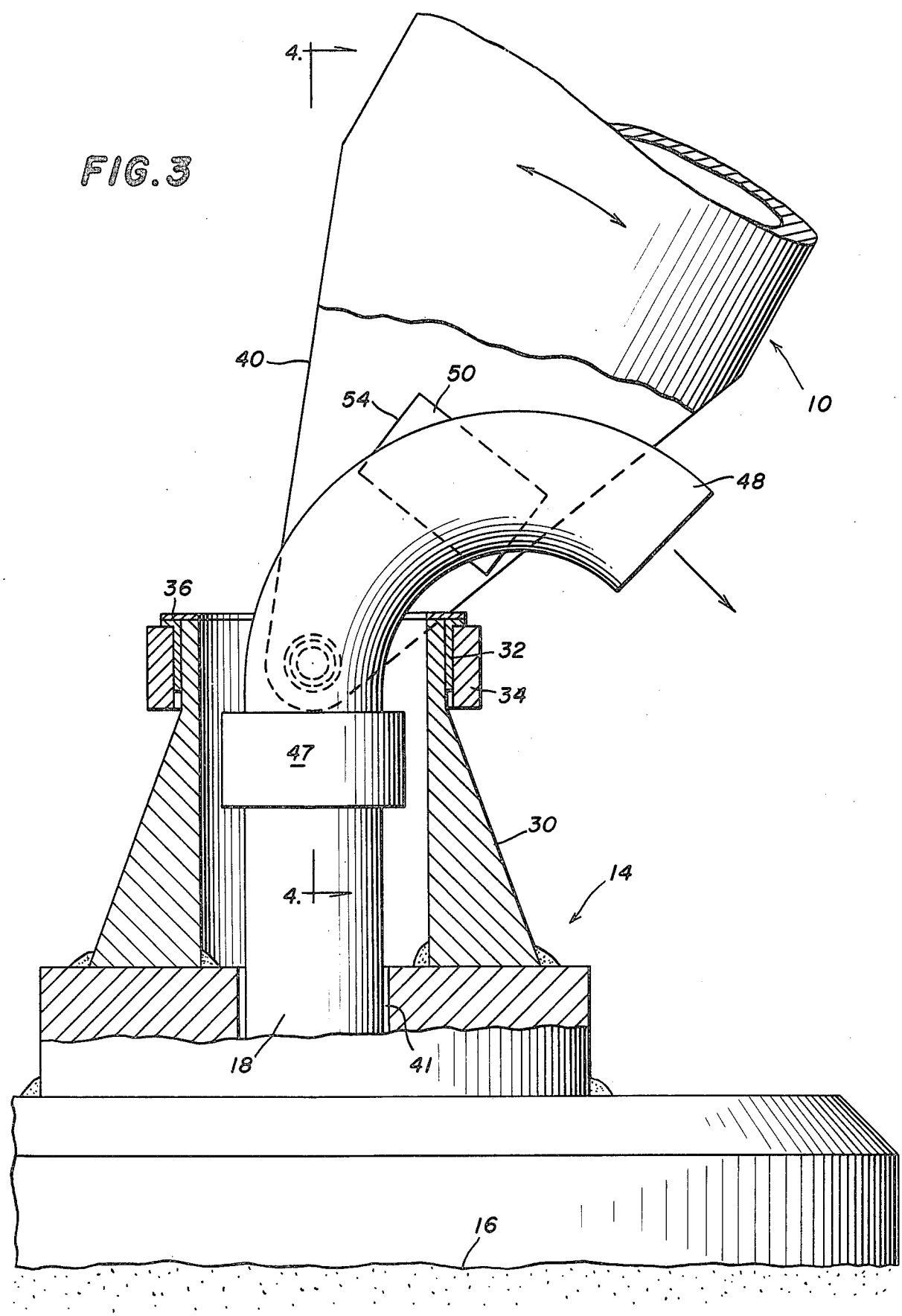
FIG. 3 is an enlarged elevational view, partially in section, of the articulated joint and conduit bypass shown in FIG. 1.
Figure 4:
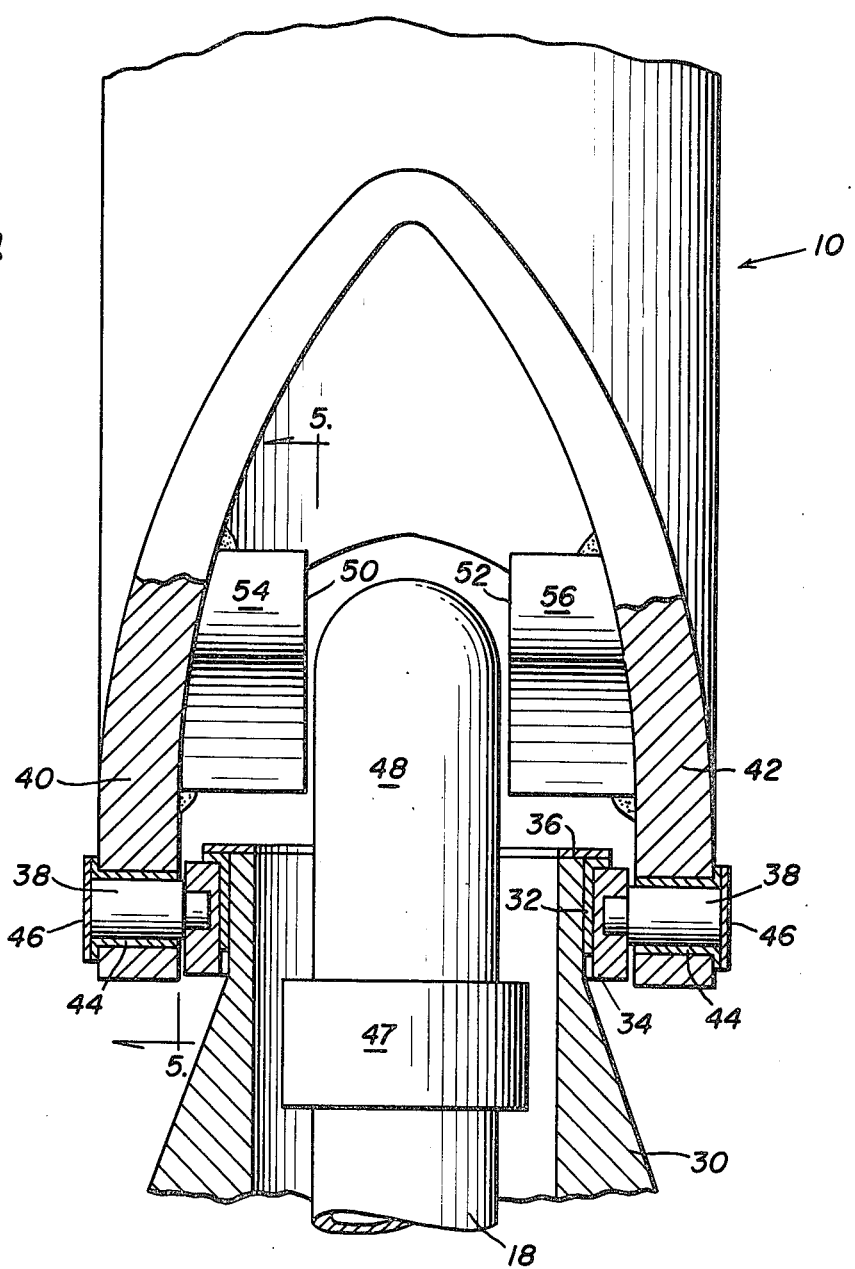
FIG. 4 is a sectional view taken along the line 4—4 of FIG. 3.
Figure 5:
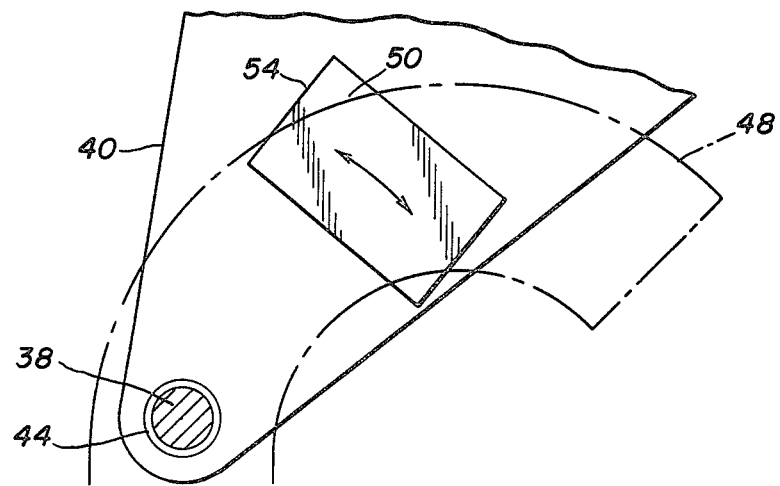
FIG. 5 is a sectional view taken along the line 5—5 of FIG. 4.

As shown in FIGS. 3 to 5, the base 14 has a conical upright support 30 around the top of which a sleeve bearing 32 fits snugly. Ring 34 fits rotatably around sleeve bearing 32. Sleeve bearing 32 is secured in place by retainer 36. Axially positioned horizontal trunnion pins 38 have reduced inner ends which fit securely into holes in ring 34.

Two identical legs 40 and 42 in spaced-apart yoke like arrangement project downwardly at the lower end of column 10. Each of legs 40 and 42 has a hole at the end containing a sleeve bearing 44 held in place by disc plate 46. The pins 38 remain stationary on ring 34 when the column 10 pivots about the horizontal axis of the pins.

Base 14 has a hole 41 through which conduit 18 runs. Swivel 47 in conduit 18 permits the elbow 48 in the conduit 18 to rotate when the column 10 rotates 360° about a vertical axis.

Elbow guides 54 and 56 are mounted respectively on the inside of legs 40 and 42 so that when the column rotates about a vertical axis the faces 50 and 52 of guides 54 and 56 push the elbow around with it, with the elbow swiveling in swivel 47. However, the guides do not apply a force to the elbow when the column moves in a vertical plane since the guides are free to slide along the sides of the elbow.

Conduit 18 extending from elbow 48 has a curved flexible portion 57 (FIG. 1) which permits the column 10 to pivot about the trunnion pins 38 without breaking the conduit. The conduit 18 can desirably be directed into column 10 and run upwardly to the top of the column.

Figure 2:
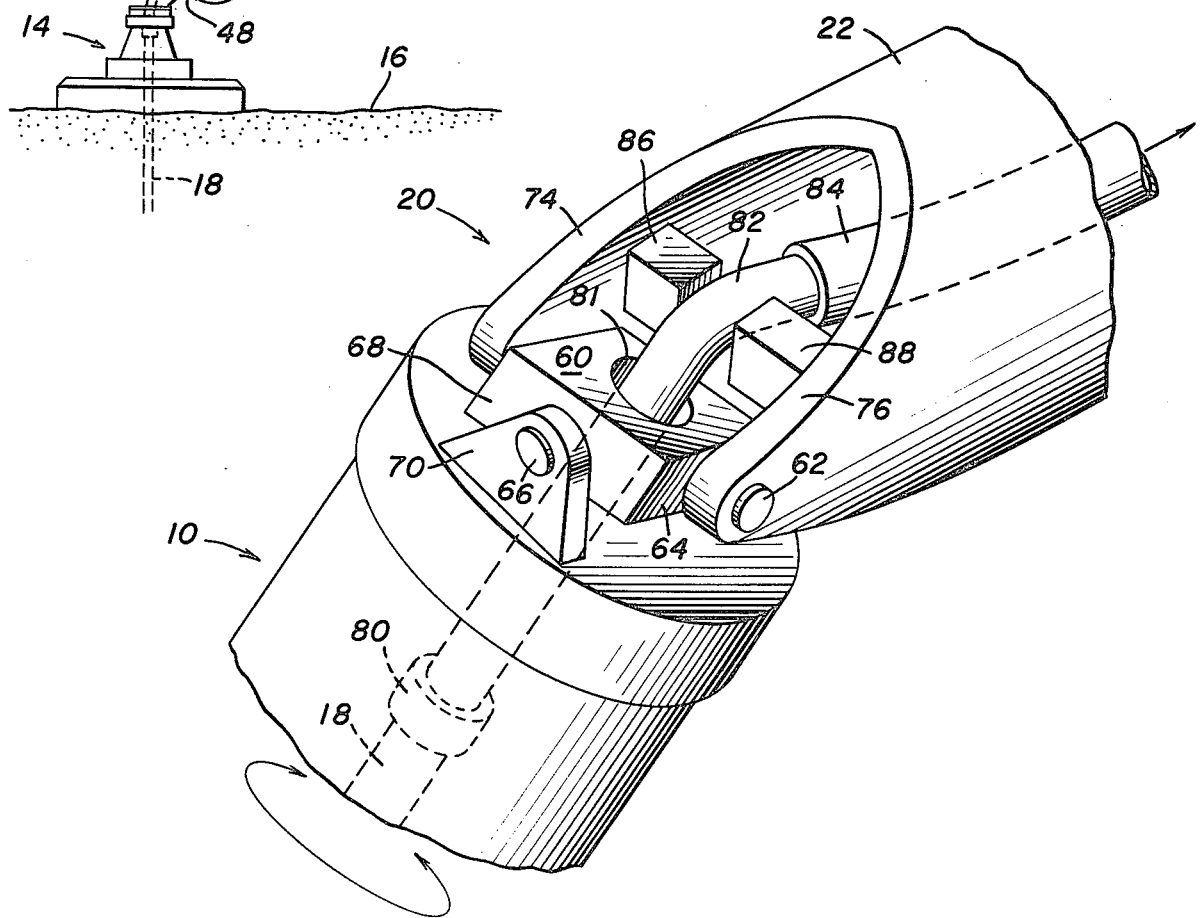
FIG. 2 is an enlarged isometric view of the articulated joint connecting the column top, shown in FIG. 1, to one end of the ship mooring boom and showing a conduit bypass of the articulated joint.

FIG. 2 illustrates how the conduit 18 can bypass the articulated joint 20 at the top of column 20. Block 60 contains a pair of pins 62 on opposing sides 64, and a pair of pins 66 on opposing sides 68. A pair of brackets or legs 70 project upwardly from the top of column 10 and receive the pins 66 in suitable bearings mounted in holes near the top of the brackets.

Two legs 74 and 76, on the end of boom 22, contain holes and bearings therein which receive pins 62.

Conduit 18 could contain a swivel 80 near the top of the column. However, a swivel 80 would usually not be used unless the top of the column is provided with a bearing means so that it could rotate independent of the portion of the column beneath the bearing means. Such a bearing means, and swivel 80, would generally not be used when the weathervaning capability is provided at the column base. Conduit 18 extends through hole 81 in block 60. Elbow 82 in conduit 18 between boom legs 74 and 76 directs the conduit into boom 22. The conduit 18 contains a flexible hose portion 84 extending into the boom so as to permit movement of the boom relative to the column without unduly stressing any rigid sections of the conduit.

Positioned between legs 74 and 76 at the end of boom 22 are guides 86 and 88 having opposing faces located close to the sides of elbow 82. When boom 22 weathervanes, the guides 86 and 88 push the elbow around yet permit the elbow to remain stationary when the boom 22 or column 10 move in a vertical plane.

The foregoing detailed description has been given for clearness of understanding only, and no unnecessary limitations should be understood therefrom, as modifications will be obvious to those skilled in the art.

What is claimed is:

1. Apparatus comprising:
a first body and a second body joined together by an articulated joint;
the articulated joint including first and second pivot means perpendicular to each other;
a conduit extending through the first pivot means and through at least part of the first body;
a portion of the conduit projecting lateral to the second pivot means and between two spaced-apart guides supported by the second body or the articulated joint whereby the second body can pivot on the second pivot means with the conduit laterally projecting portion arranged between the guides, and rotation of the second body causes the guides to apply torque to the conduit laterally projecting portion; and
said conduit extending from the conduit laterally projecting portion into supporting arrangement on the second body.

2. Apparatus according to claim 1 in which the conduit has a flexible portion between the laterally projecting portion and the second body.

3. Apparatus comprising:
a first body and a second body joined together by an articulated joint;
the articulated joint including a first pivot means for rotational movement of the first body and second body relative to each other, and a second pivot means for angular movement of the second body relative to the first body about an axis perpendicular to the first pivot;
a conduit extending through the first pivot means and through at least part of the first body, with said conduit having a swivel positioned for rotation axially of the first pivot means;
a portion of the conduit projecting lateral to the second pivot means and between two spaced-apart guides supported by the second body or the articulated joint whereby the second body can pivot on the second pivot means with the conduit laterally projecting portion arranged between the guides, and rotation of the second body on the first pivot means causes the guides to apply torque to the conduit laterally projecting portion; and
said conduit extending from the conduit laterally projecting portion into supporting arrangement on the second body.

4. Apparatus according to claim 3 in which the first body is a base secured to a sea floor, the second body is a column, the first pivot means has a vertical axis and the second pivot means has a horizontal axis.

5. Apparatus according to claim 4 in which the column lower end has a yoke-like structure and the guides are in the yoke.

6. Apparatus according to claim 3 in which the conduit is a fluid conduit.

7. Apparatus according to claim 6 in which the conduit has a flexible portion between the laterally projecting portion and the second body.

* * * * *